United States Patent [19]
Kalafus et al.

[11] Patent Number: 5,969,670
[45] Date of Patent: Oct. 19, 1999

[54] INEXPENSIVE MONITORING TECHNIQUE FOR ACHIEVING HIGH LEVEL INTEGRITY MONITORING FOR DIFFERENTIAL GPS

[75] Inventors: Rudolph M. Kalafus, Los Gatos; Ralph F. Eschenbach, Woodside, both of Calif.

[73] Assignee: Trimble Navigation Limited, Sunnyvale, Calif.

[21] Appl. No.: 09/010,812

[22] Filed: Jan. 22, 1998

[51] Int. Cl.$^6$ ................................................ H04B 7/185
[52] U.S. Cl. ........................................ 342/357.02; 244/183
[58] Field of Search ............................ 342/357; 244/183

[56] References Cited

U.S. PATENT DOCUMENTS 5,663,732  9/1997  Stangeland ............................ 342/357
5,702,070  12/1997  Waid .................................... 244/183

Primary Examiner—Gregory C. Issing
Assistant Examiner—Devin Drummond
Attorney, Agent, or Firm—Wagner, Murabito & Hao

[57] ABSTRACT

A dual global positioning system (GPS) receiver navigation system. The system of the present invention includes a primary GPS receiver adapted to determine a first position. The primary GPS receiver is certified to a first integrity level and is further adapted to provide GPS navigation data to an external device. The system of the present invention also includes a secondary GPS receiver coupled to the primary GPS receiver. The secondary GPS receiver is certified to a second integrity level having less stringent requirements than the first integrity level. The secondary GPS receiver is adapted to determine a second position and monitor the primary GPS receiver to detect a fault condition by comparing the first position and the second position, such that the GPS navigation data is provided in accordance with the first certification level regardless of the second integrity level of the secondary GPS receiver.

22 Claims, 6 Drawing Sheets

INEXPENSIVE MONITORING TECHNIQUE FOR ACHIEVING HIGH LEVEL INTEGRITY MONITORING FOR DIFFERENTIAL GPS

TECHNICAL FIELD

The present invention relates generally to aviation navigation systems. More specifically, the present invention pertains to a high-level integrity monitoring system for differential global positioning system (DGPS) avionics.

BACKGROUND ART

The aviation industry relies upon numerous navigation aids in order safely to take off, navigate enroute, and land aircraft. Such navigation aids (naviads) include, for example, the instrument landing system (ILS), very high frequency omni-directional range (VOR) system, and the like. GPS, however, is increasingly being accepted as an alternative to traditional navigation aids, including even ILS.

Essentially, GPS is a space-based radio positioning network for providing users, equipped with suitable receivers, highly accurate position, velocity, and time (PVT) information. Developed by the United States Department of Defense (DOD), the space based portion of GPS comprises a constellation of GPS satellites in non-geosynchronous orbits around the earth.

FIG. 1 shows the constellation 100 of GPS satellites 101 in orbit. The GPS satellites 101 are located in six orbital planes 102 with four of the GPS satellites 101 in each plane, plus a number of "on orbit" spare satellites (not shown) for redundancy. The GPS satellites 101 are located in orbital planes, having an inclination of 55 degrees relative to the equator and an altitude of approximately 20,200 km (10,900 miles), and typically complete an orbit in approximately 12 hours. This positions each of the GPS satellites 101 in such a manner that a minimum of five of the GPS satellites 101 are normally observable (above the horizon) by a user anywhere on earth at any given time.

GPS position determination is based upon a concept referred to as time of arrival (TAO) ranging. The orbiting GPS satellites 101 each broadcasts spread-spectrum microwave signals encoded with positioning data. The signals are broadcast on two frequencies, L1 at 1575.42 MHz and L2 at 1227.60 MHz, with the satellite ephemeris (positioning data in an earth centered, earth fixed, coordinate system) modulated using bi-phase shift keying techniques. Essentially, the signals are broadcast at precisely known times and at precisely known intervals. The signals are encoded with their precise time of transmission. A user receives the signals with a GPS receiver. The GPS receiver is designed to time the signals and to demodulate the satellite orbital data contained in the signals. Using the orbital data, the GPS receiver determines the time between transmission by the satellite and reception by the receiver. Multiplying this time by the speed of light gives what is termed as the pseudo-range measurement of that satellite. If the GPS receiver clock were perfect, this measurement would be the range measurement for that satellite, but the imperfection of the clock causes the two measurements to differ by the time offset between actual time and receiver time. Thus, the measurement is called a pseudo-range, rather than a range. However, the time offset is common to the pseudo-range measurements of all the satellites. By determining the pseudo-ranges of four or more satellites, the GPS receiver is able to determine its location in three dimensions, as well as the time offset. Thus, a user equipped with a proper GPS receiver is able to determine his PVT with great accuracy, and use this information to navigate safely and accurately from point to point, among other uses.

While this position is more accurate than that obtainable using conventional navaids, there are aviation applications (e.g., take off and landing phases of flight) where an even greater level of accuracy is required. To attain these levels of accuracy, DGPS technology is employed.

DGPS functions by observing the difference between pseudo-range measurements determined from the received GPS signals with the actual range as determined from the known reference station point. The DGPS reference station determines systematic range corrections for all the satellites in view based upon the observed differences. The systematic corrections are subsequently broadcast to interested users having appropriate GPS receivers, and thereby enable the users to increase the accuracy of their GPS determined position. DGPS service and the supporting industry (e.g., avionics manufacturers) are increasingly being employed throughout the world.

In addition to accuracy, two other qualities are particularly important in the avionics field. The first of these qualities is reliability. Reliability in this context refers to the probability that a given avionics system will remain operational (e.g., continuity of service). The second of these qualities is integrity. In this context, integrity refers to the capability of equipment to assure that hazardously misleading information (HMI) is not generated and output from the equipment. Aircraft landing systems require high integrity levels in order to assure that a high enough level of safety is achieved. This integrity is usually expressed negatively, i.e., in terms of the probability of generating HMI during an hour of operation, or during an approach. To meet what is termed a "flight-essential" level of safety means to meet the requirement that the probability of generating HMI must be less than approximately 1 part in $10^7$ during an approach for passenger-carrying aircraft.

It is generally accepted practice that single-thread equipment (e.g., equipment without redundancy, in particular equipment that involves software and firmware) is considered to achieve only about 1 part in $10^5$ per approach. To achieve the $10^7$ level of integrity or better, redundant GPS receivers are usually used. This makes the total cost of the GPS avionics system quite high.

For example, large commercial air carriers (e.g., a commercial airline) typically employ redundant systems to achieve both the required degree of reliability (or continuity of service) and integrity. Two or more GPS receivers are installed into a GPS system of an aircraft. Each system is capable of functioning independently of the other, such that a failure in one system does not affect the operation of the other redundant system. Hence, the GPS system remains operational (e.g., GPS navigation information is still available) even though one GPS receiver has failed. This increases the reliability of GPS system, since for a system failure to occur, more than one GPS receiver must fail. Thus, even though, one GPS receiver has failed, the aircraft can continue in service until a convenient time of repair occurs.

In addition to increasing reliability, the incorporation of two or more GPS receivers into a GPS system increases integrity. For example, where two or more GPS receivers are installed, each of the receivers monitors the GPS signals and the differential corrections independently. This allows the GPS receivers to check the "health" of each other (and achieve the required $10^7$ level of integrity). If the GPS receivers do not agree, if their respective solutions differ by more than some pre-determined amount, the GPS system declares a fault, thus warning the rest of the avionics systems in the aircraft (e.g., the flight director) that the GPS system is currently unusable, and warning the air crew to utilize other navigation instruments or take other appropriate action (e.g., abort the approach).

While reliability is very important to some users, integrity is very important to all users. For example, with commercial air carriers, where flight cancellations due to maintenance are prohibitively costly, reliability is very important. Hence, very expensive and often redundant GPS receiver systems are installed. However, with a corporate aircraft or even a general aviation aircraft, the down time for a repair is much less costly, and hence reliability is less important. But in order to achieve satisfactory levels of integrity, the same very expensive, often redundant systems must be installed.

In particular, as the Wide-Area Augmentation System (WAAS) and the Local Area Augmentation System (LAAS) is phased in, costs of redundancy become prohibitive for many potential users. The problem is exacerbated by the fact that the current ILS landing system allows for single-thread operation for many users. While commercial air carriers are not cost sensitive and generally have redundant systems installed for reliability, many other potential users are precluded from installing and using GPS systems having the required degree of integrity because of cost.

Thus, what is required is a GPS system which provides a flight-essential degree of integrity. What is required is a system which supports the use of inexpensive GPS receivers, yet still meets the flight-essential integrity requirements. What is further required is a system which supports other navigation applications in addition to aviation. The present invention provides a novel solution to the above requirements.

DISCLOSURE OF THE INVENTION

The present invention provides a navigation system which ensures a flight-essential degree of integrity. The system of the present invention supports the use of inexpensive GPS receivers while still meeting flight-essential integrity requirements. The present invention further provides a system which supports other navigation applications in addition to aviation.

In one embodiment, the present invention comprises a dual GPS receiver navigation system. The system of the present invention includes a primary GPS sensor, adapted to determine a first position. The primary GPS sensor is certified to a flight-essential integrity level and is further adapted to provide GPS navigation data to other instruments installed on an aircraft. Such instruments include, for example, the aircraft's autopilot. The system of the present invention also includes a secondary GPS monitor, coupled to the primary GPS sensor. The secondary GPS monitor is certified to a lower integrity level than that of the primary GPS sensor. The secondary GPS monitor is adapted to determine a second position and monitor the primary GPS sensor to detect a fault condition by comparing the first position and the second position. If the two positions differ by more than a predetermined amount, a fault is declared.

The secondary GPS monitor functions by detecting errors within the primary GPS sensor. Consequently, since the primary GPS sensor directly drives the other instruments installed in the aircraft (e.g., the autopilot), the secondary GPS monitor needs not be designed to the same standards as the primary GPS sensor. In so doing, the system of the present invention provides GPS navigation data in accordance with the flight-essential certification level while supporting the use of an inexpensive secondary GPS monitor, thus enhancing the affordability of the present invention.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION OF THE INVENTION

Reference will now be made in detail to the preferred embodiments of the invention, an inexpensive monitoring technique for achieving high level integrity monitoring for GPS, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail so as not to unnecessarily obscure aspects of the present invention.

The present invention provides a navigation system which ensures a flight-essential degree of integrity. The system of the present invention supports the use of inexpensive GPS receivers while still meeting flight-essential integrity requirements. The present invention further provides a system which supports other navigation applications in addition to aviation.

Figure 1:
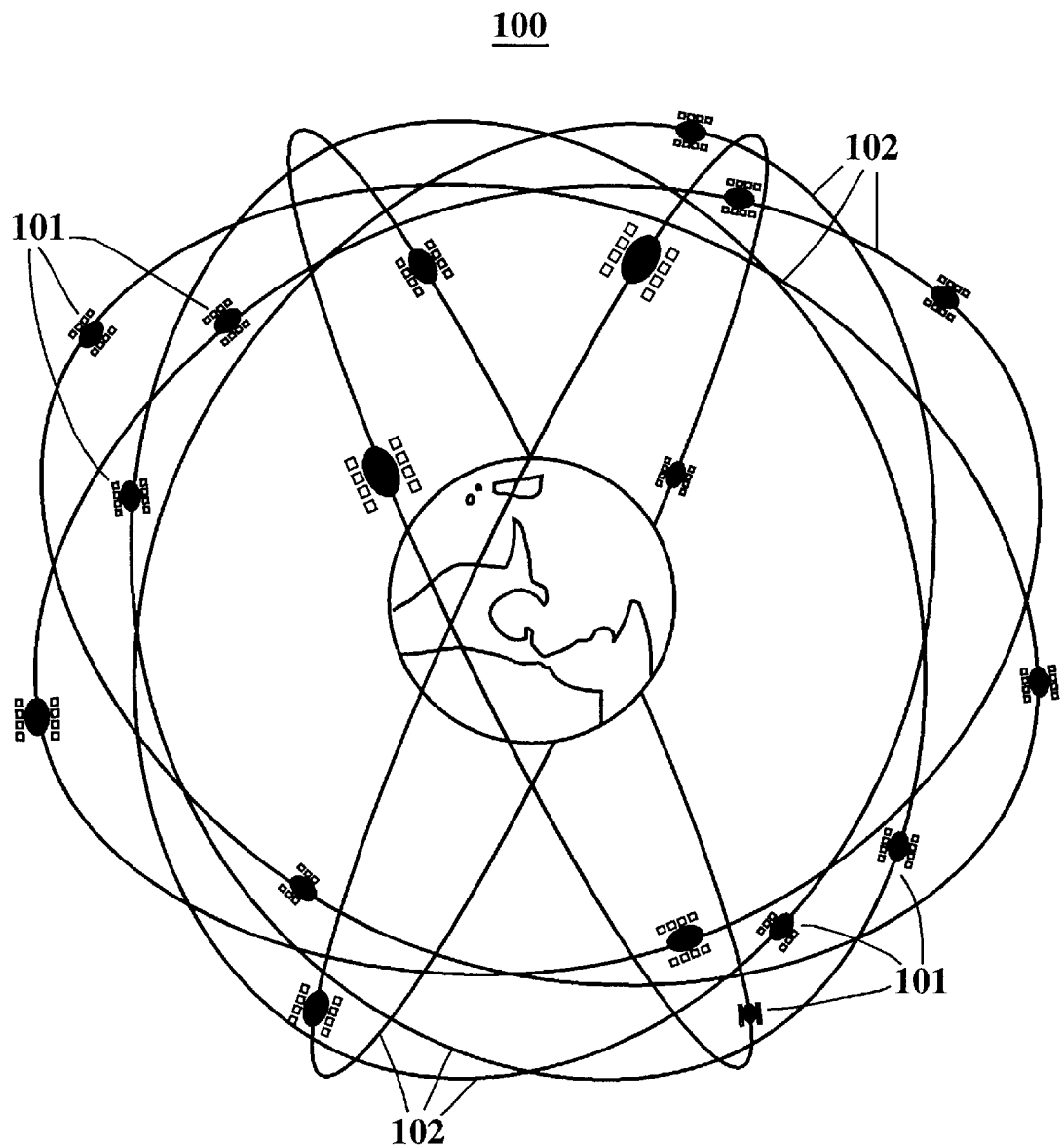
FIG. 1 shows a constellation of GPS satellites in orbit.
Figure 2:
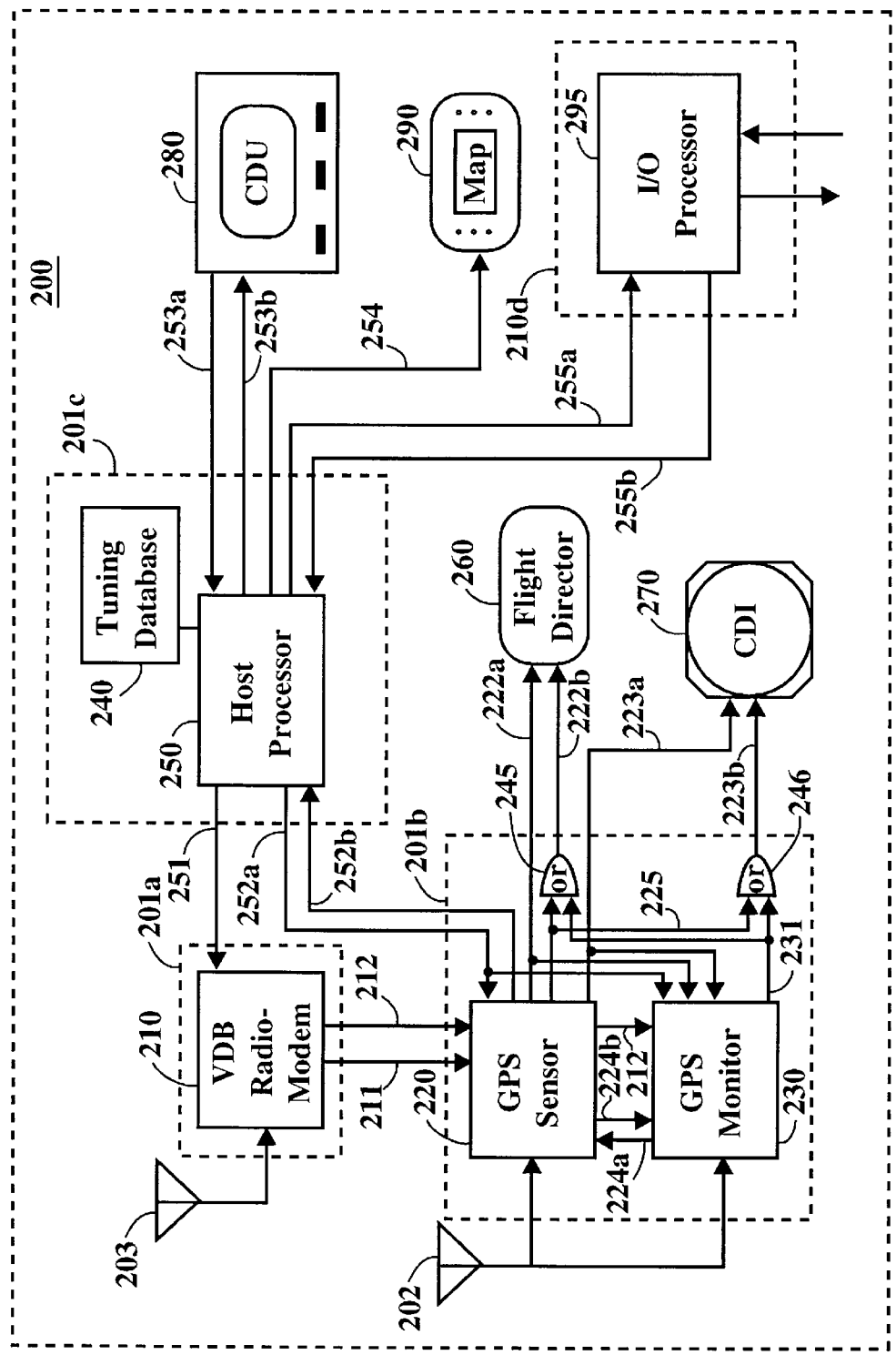
FIG. 2 is a block diagram of a system in accordance with one embodiment of the present invention.

Described in the preferred embodiment is equipment that can receive differential corrections either from a data link (e.g., VDB 210, in the case of LAAS) or from a transmission that looks like a GPS satellite (e.g., WAAS). The same principles and claims apply to equipment that accepts either or both forms of differential corrections. Flight path data are received from the ground-based data broadcast, if it exists; otherwise flight path data are obtained from a database accessed by the host processor 250. Referring now to FIG. 2, a block diagram of a system 200 in accordance with one embodiment of the present invention is shown.

In the present embodiment, system 200 is a portion of an avionics suite installed on an aircraft. System 200 includes 4 primary components: components 201a; 201b; 201c; and 201d. Component 201a includes a VDB (VHF data broadcast) radio modem 210; it should be appreciated that either a single antenna 202 or separate antennas can be used for both GPS sensor and GPS monitor; component 201b includes a primary GPS sensor 220 (hereafter GPS sensor 220) and a secondary GPS monitor 230 (hereafter GPS sensor 230); component 201c includes a host processor 250 and a coupled tuning data base 240; and component 201d includes an I/O (input-output) processor 295. In the present embodiment, system 200 also includes a CDU (command display unit) 280, a moving map display 290 (hereafter referred to as map 290), a flight director 260, a CDI (course deviation indicator) 270, and antennas 202 and 203.

System 200, in accordance with the present invention, ensures a flight-essential degree of integrity by using two GPS receivers, GPS sensor 220 and GPS monitor 230, to provide navigation information and fault detection. System 200 is less expensive than prior art systems due to the fact that GPS monitor 230 is a less complex, less expensive GPS receiver used to detect a failure or some other problem with GPS sensor 220. GPS sensor 220 is a full function, full capability GPS receiver. Accordingly, GPS sensor 220 provides navigation information to the other units of system 200 (e.g., flight director 260). GPS monitor 230 provides information used merely for comparison with GPS sensor 220.

Navigation information provided by GPS sensor 220 is compared with navigation information provided by GPS monitor 230. If the information from GPS sensor 220 and the information from GPS monitor 230 disagree by more than a predetermined amount, a fault is indicated via line 231. Otherwise, GPS monitor 230 indicates system 200 is operating normally, within established parameters. GPS monitor 230 is used to cross-check the functionality of GPS sensor 220 as opposed to providing navigation data for the other units (e.g., flight director 260), and, hence, its design is optimized for this purpose. Consequently, GPS monitor 230 is much less complex and much less expensive than GPS sensor 220, while still providing a high degree of fault detection to ensure integrity. In this manner, system 200 of the present invention ensures a flight-essential degree of integrity and is less expensive than prior art solutions.

Referring still to FIG. 2, VDB radio modem 210 sends differential correction messages, flight path data, and other information received from a local broadcast DGPS ground station via antenna 203 to GPS sensor 220 and GPS monitor 230 via lines 211 and 212 respectively. Both GPS sensor 220 and GPS monitor 230 decode the differential correction messages and recover the differential corrections, the integrity parameters, and the data defining the intended flight path. GPS sensor 220 and GPS monitor 230 receive GPS signals via antenna 202, and determine GPS position measurements therefrom. The differential corrections received from VDB radio modem 210 are applied to the GPS position measurements to achieve highly accurate position information.

The flight path data received via VDB radio modem 210 are used to generate an intended path of the aircraft in space, such that the lateral and vertical distances of the aircraft (e.g., left/right, above/below) with respect to the intended flight path can be determined. Full scale deflection of the display of CDI 270 varies with the lateral and vertical distances away from the intended flight path, and is set according to the particular requirements. According to the settings, GPS sensor 220 uses the intended flight path of the aircraft and the navigation information to compute the deviations of the aircraft from the intended flight path. GPS sensor 220 subsequently sends the deviation information to flight director 260 and CDI 270 via line 222a and 223a respectively. CDI 270 displays the deviation information to the pilot, and flight director 260 directs the aircraft's autopilot (not shown).

In accordance with the present invention, GPS sensor 220, independent of GPS monitor 230, also performs integrity checking, using the data broadcast from the DGPS ground station, to assure that there are no failures or fault conditions in the GPS satellites or DGPS ground station that would cause HMI. Based on the integrity checks, alerts are developed 222b and 223b which notify the pilot or autopilot, flight director whenever a fault is detected.

If the differential correction information is not being obtained from the VDB radiomodem but from a WAAS or similar broadcast, the GPS sensor 220 and monitor 230, must decode the message to obtain the differential correction information. In this case, the flight path data is obtained by the GPS sensor and monitor from the host processor 250 via line 252a. The integrity checks are similar for both ground-based and WAAS-like operations. System 200 is protected against GPS satellite and DGPS ground station faults to better than a $10^7$ level of integrity through the function of GPS sensor 220 independent of the function of GPS monitor 230. GPS sensor 220, however, cannot detect some faults within itself. Hence, GPS monitor 230 functions by detecting the faults within GPS sensor 220. The probability of an integrity fault within GPS sensor 220 is generally considered to about $10^5$ per approach. Consequently, GPS monitor 230 is required to detect integrity faults with a probability of at least 99%. To add margin, the present GPS monitor 230 is adapted to detect faults with a probability of 99.9% (e.g., an order of magnitude better than 99%).

Referring still to FIG. 2, additional functions of system 200 are shown in addition to GPS sensor 220 and GPS monitor 230. Such functions include, for example, the automatic tuning of VDB radio modem 210 by host processor 250 via line 251 either from information stored in a tuning data base 240 or from pilot input. Host processor 250 primarily performs pilot interface functions and drives displays. Host processor 250 is coupled to I/O processor 295 via lines 255a and 255b, coupled to map 290 via line 254, and coupled to CDU 280 via lines 253a and 253b.

I/O processor 295 handles interfaces with other cockpit instruments (e.g., instruments external to system 200). Map 290 functions by providing a moving map display to the pilot. CDU 280 functions as an enunciator panel and command input panel for displaying system 200 status to the pilot and accepting inputs from the pilot.

It should be appreciated that VDB radio modem 210 does not have to be designed to flight-essential integrity standards because the messages it passes (e.g., the messages received from the DGPS ground station) are highly protected by a cyclic redundancy check, which assures that erroneous information does not pass through it.

It should also be appreciated that GPS sensor 220 directly interfaces with the autopilot, flight director 260, and/or deviation displays (e.g., CDI 270). GPS sensor 220 interfaces with flight director 260 and CDI 270 directly as opposed to interfacing through host processor 250. As a consequence, only the GPS sensor 220 is capable of generating HMI. Thus, of the systems shown in system 200, GPS sensor 220 is the only one that needs to meet the higher certification requirements associated with flight-essential operation.

It should further be appreciated that in order for functions other than GPS sensor 220 to have lower certification requirements, and, in order to assure that the analog signal used to drive CDI 270 is not corrupted by a faulty digital-to-analog (D/A) converter, the D/A converters for vertical and lateral guidance may be included within GPS sensor 220. Similarly, GPS monitor 230 includes corresponding analog-to-digital (A/D) converters in order to detect faults in the D/A converters of GPS sensor 220. Hence, GPS monitor 230 is coupled to receive outputs from GPS sensor 220 on lines 222a and 223a. GPS sensor 220 and GPS monitor 230 also share status information via lines 224a and 224b and, in addition, drive failure indicator flags within flight director 260 and CDI 270 via line 231 and line 225 and OR gates 245 and 246. The OR gates 245 and 246 indicate a fault condition via lines 222b and 223b if any of several failure conditions is detected.

It should be noted that a digital output of GPS sensor 220 is also coupled to host processor 250 via line 252b in order to detect faults in the components involved in communicating digital signals. Such components include components 201a–201d. The digital output on line 252b includes failure status outputs from GPS monitor 220 and other information which continuously indicates the health of GPS sensor 220. This information can be fed directly to a cockpit display or annunciator (e.g., on CDU 280 via host processor 250). System 200 mode information is coupled to GPS sensor 220 via line 252a. Embodiments of GPS sensor 220 and GPS monitor 230 are described in greater detail below.

Figure 3:
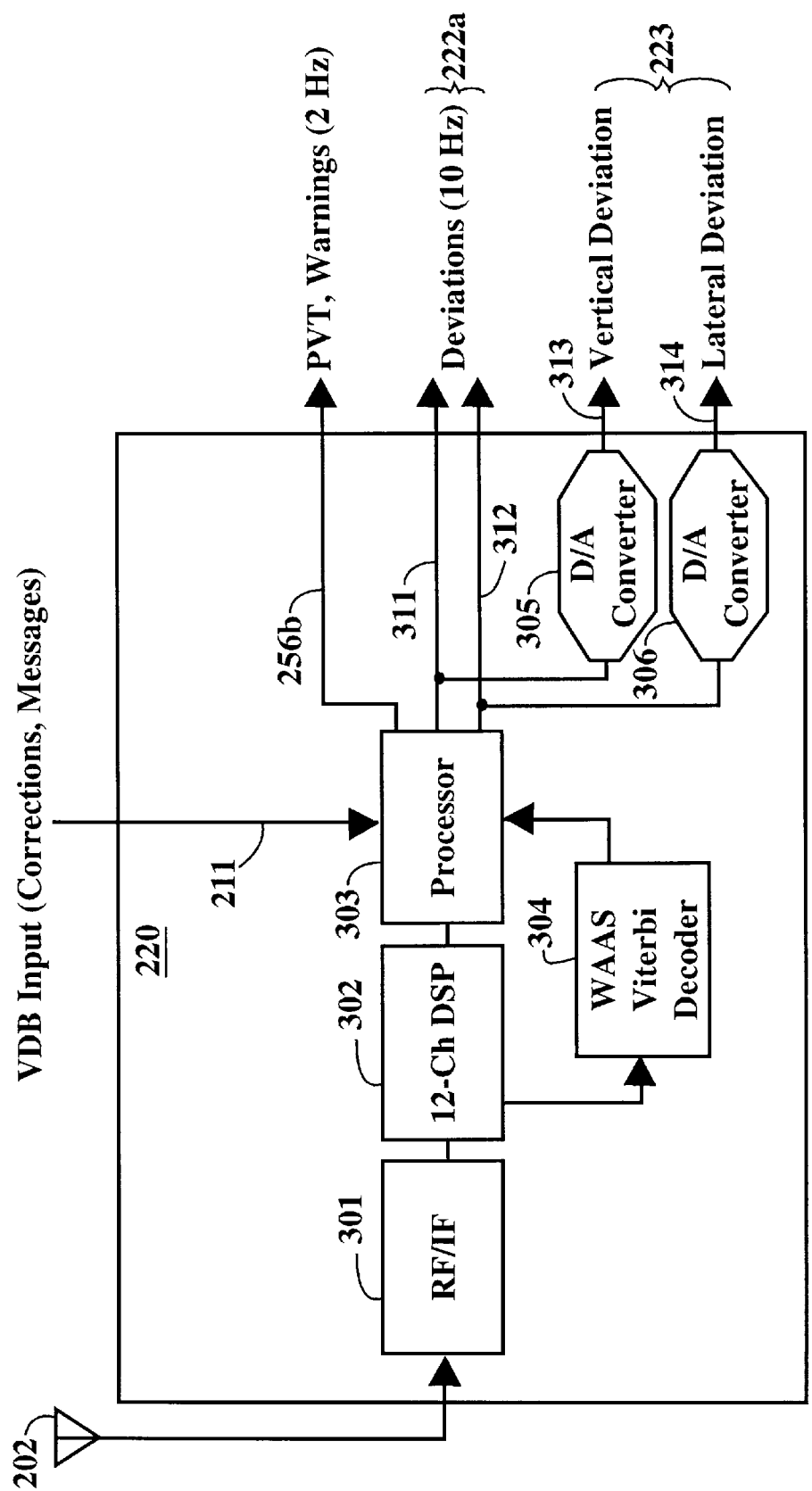
FIG. 3 is a schematic diagram of a primary GPS sensor in accordance with one embodiment of the present invention.

With reference now to FIG. 3, GPS sensor 220 in accordance with one embodiment of the present invention is shown in greater detail. GPS sensor 220 includes a radio frequency (RF) down-converter 301 coupled to antenna 202. RF down-converter 301 is coupled to a DSP having typically 12 channels (digital signal processor) 302, which, in turn, is coupled to a processor 303 and a WAAS Viterbi decoder 304. Using well known GPS techniques, GPS sensor 220 generates DGPS PVT using VDB input information received from VDB radio modem 210 of FIG. 2 via line 211, in addition to the GPS information. Using this PVT, as described above, GPS sensor 220 determines vertical and lateral deviations and produces both a digital version and an analog version of the vertical and lateral deviation outputs. The digital version is coupled to lines 311 and 312 (e.g., which comprise line 222a from FIG. 2) and is output typically at a rate of 5–10 Hz. The analog version is generated using a D/A converter 305 and a D/A converter 306 and is coupled to lines 313 and 314, respectively (e.g., which comprise line 223a from FIG. 2).

Figure 4:
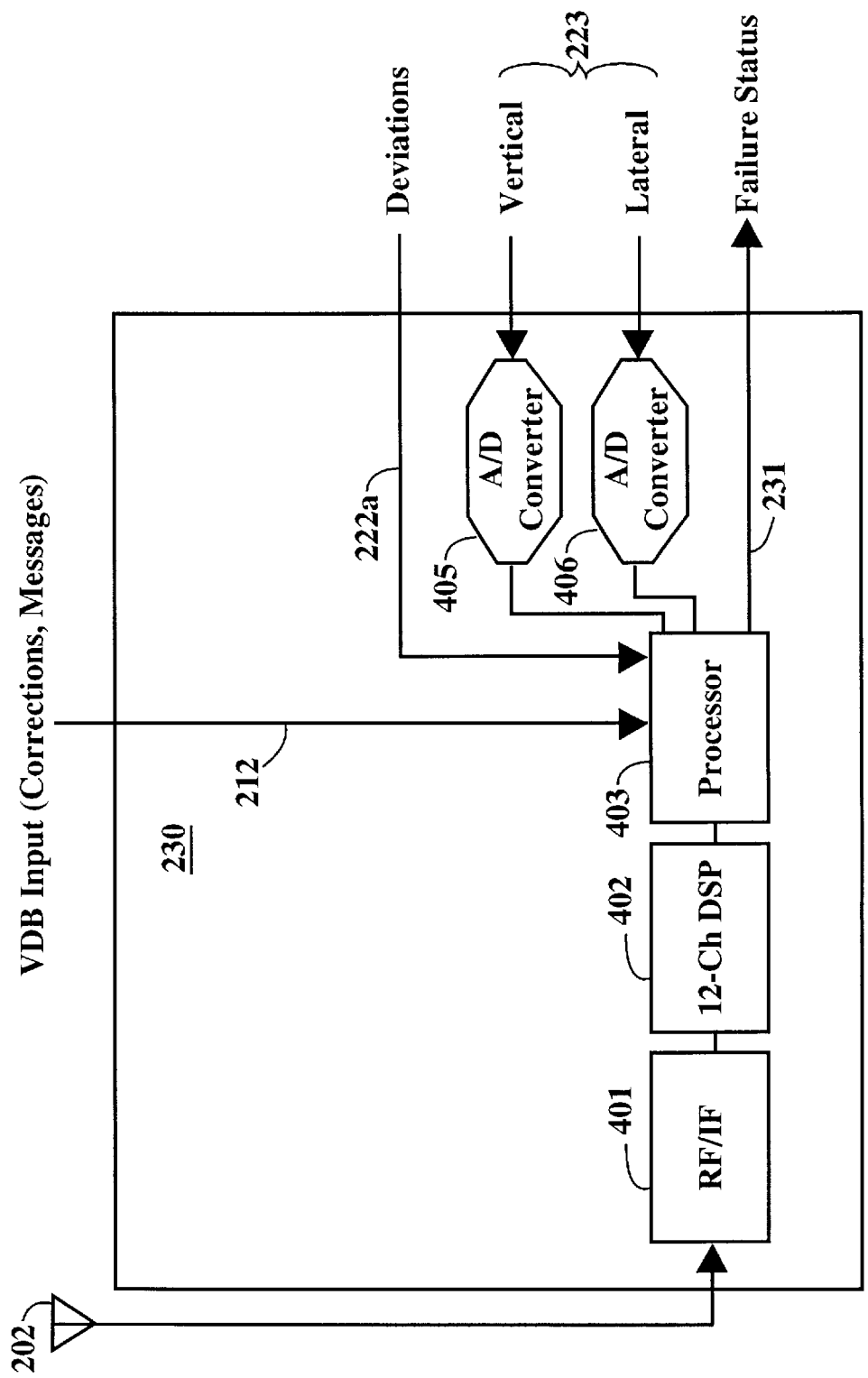
FIG. 4 is a schematic diagram of a secondary GPS monitor in accordance with one embodiment of the present invention.

With reference now to FIG. 4, GPS monitor 230 in accordance with one embodiment of the present invention is shown in greater detail. GPS monitor 230 includes an RF down-converter 401 coupled to antenna 202. RF down-converter 401 is coupled to a DSP 402 which could use fewer channels than the GPS sensor, which, in turn, is coupled to a processor 403. As with GPS sensor 220, GPS monitor uses well known GPS techniques to generate DGPS PVT using VDB input information received from VDB radio modem 210 of FIG. 2 via line 212 or by information received from a WAAS-like broadcast directly from the GPS antenna 202.

GPS monitor 230 further includes an A/D converter 405 and an A/D converter 406 coupled to receive the analog deviation information from GPS sensor 220 (e.g., via lines 313 and 314, of FIG. 3, also shown as line 223a in FIG. 2). GPS monitor 230 converts the analog signals back to digital in order to verify the accuracy and status of D/A converters 305 and 306 in GPS sensor 220. Failure status information is communicated to the rest of system 200 via line 231.

As described above, there are several reasons why GPS monitor 230 is less complex and less expensive than GPS sensor 220, while still providing a high degree of integrity. For example, in a prior art dual GPS system, the redundant GPS receiver will typically be a 12-channel GPS receiver. GPS monitor 230, in accordance with the present invention, however, is only an 8-channel GPS receiver, and thus, is less expensive.

Another reason is that while the GPS sensor 220 needs to output PVT information at a rate of 5–16 times per second, GPS monitor 230 need only output PVT information at the rate of 1–2 times per second. This is due to the fact that the update rate of GPS sensor 220 is dictated by the requirements of the flight director 260 and the autopilot display latency considerations. In contrast, the update rate of GPS monitor 230 is driven by a time-to-alarm requirement of system 200, which is 6 seconds for Category I landing operations. Thus, a less expensive processor 403 is required, one that can be clocked at a lower rate.

Another reason for the lower cost of GPS monitor 230 in comparison to GPS sensor 220 is due to certification requirements. In accordance with the certification requirements of RTCA DO-178B, GPS sensor 220 needs to meet a Level B certification requirement. GPS monitor 230, however, need only meet the less stringent, and hence less expensive, Level C requirement since GPS monitor 230 cannot generate HMI. The certification process for Level C devices (e.g., GPS sensor 220) is much less expensive than the process for Level B devices (e.g., GPS monitor 230).

It should be appreciated that although system 200 of the present invention is described as an embodiment tailored in accordance with the requirements of RTCA DO-178B, Level B and Level C, the present invention can be readily modified to function in accordance with other stadards, or with evolving standards. For example, as FAA standards and certification requirements change and evolve with respect to particular requirements of some segments of the aviation industry, system 200 can be tailored to function in accordance with the new or evolved standards while remaining within the scope of the present invention. For example, in a case where, at some point in the future, FAA certification requirements for small aircraft change to RTCA DO-178B Level C and Level D respectively, the system of the present invention can be readily modified to function accordingly.

Another reason is the relative PVT output accuracy requirements of GPS sensor 220 versus GPS monitor 230. Whereas GPS sensor 220 needs to meet stringent PVT accuracy requirements, GPS monitor 230 need only detect dangerous GPS sensor 220 outputs (e.g., large errors which would lead to HMI). Consequently, a less complex, less expensive GPS engine (e.g., 8 channel DSP 402) can be used in GPS monitor 230.

In addition, yet another reason why GPS monitor 230 is less complex and less expensive than GPS sensor 220 is the fact that whereas the GPS sensor 220 requires highly accurate, highly reliable state-of-the-art electronics, GPS monitor 230 uses off-the-shelf electronics which are much cheaper.

In addition, the architecture of system 200 avoids passing of critical data through host processor 250 or I/O processor 295. In so doing, system 200 avoids the necessity of certifying host processor 250 or I/O processor 295 in accordance with RTCA DO-178B Level B. This further reduces the overall certification costs of system 200.

It should be noted that the lateral and vertical thresholds of GPS monitor 230, against which the magnitude of the difference between GPS sensor 220 deviations and GPS monitor 230 deviations are compared (e.g., the absolute value of S −M, or |S−M|), should be chosen to balance the probability of detecting a failure in GPS sensor 220 and the probability of declaring a failure when none exists (e.g., a false alert). For example, if the threshold is too high, the detection probability will be too small. If the threshold is too low, there will be an excessive number of false alerts declared. Probability of detection is associated with integrity, while false alerts are associated with continuity of service. There are requirements on each that need to be met. In accordance with the present embodiment, it is assumed that the requirements are as follows:

1. Probability of detection >99.9%, given that a fault occurs in GPS sensor 220;
2. Probability of false alert <$4\times10^{-5}$ per approach lasting 150 seconds.

Thus, the threshold T in Equation 1 below is chosen to meet these requirements for any fault that could cause HMI:

Equation 1

Fault declared if |S−M|>T meters, where:

S is the GPS sensor deviation in meters;

M is the GPS monitor deviation in meters; and

T is the threshold in meters, typically 5–10 meters in the vertical, 20–40 meters lateral.

For large faults (e.g., faults causing errors of 20 meters or more in the vertical) the threshold would always be exceeded for a GPS monitor having a 2-$\sigma$ accuracy of 5 meters or better. Alternately, a fault causing a small error of, for example, 2 meters, while technically a failure, would not usually result in HMI.

T must be chosen to be large enough to meet the false alert requirements in the fault-free case. Assuming the fault-free errors to be normally distributed, and assuming 10 independent samples per 150-second period (assumes carrier-smoothing of the code phase, and slowly varying airborne multipath), $4\times10^{-5}$ per approach translates to $4\times10^{-6}$ per samples which corresponds to about 4.6 standard deviations. If the GPS sensor and GPS monitor were equally accurate, the GPS monitor threshold would have to be set at 3.25 x the GPS sensor 1-$\sigma$ accuracy or greater. If the GPS monitor were half as accurate as the GPS sensor, the GPS monitor threshold would have to be set at 4.1 x the GPS sensor 1-$\sigma$ accuracy or greater. Thus for a GPS sensor providing 1 meter (1-$\sigma$) vertical accuracy (including only receiver noise and airborne multipath), the GPS monitor thresholds would be 3.25 meters in the first case, and 4.1 meters in the second.

It should be noted that 99.9% corresponds to 3.29$\sigma$. In the first case above, the standard deviation of |S−M| is about 1.41 meters, so 3.29$\sigma$ is about 4.6 meters. A GPS monitor threshold of 3.25 meters then will trigger on more than 99.9% of faults larger than 3.25+4.6=7.9 meters. In the second case, the GPS monitor threshold of 4.1 meters will trigger on more than 99.9% of faults larger than 4.1+7.4= 11.5 meters. The values of 7.9 and 11.5 meters for these cases compare favorably with the 10.2 meters currently being cited for LAAS, and with the 19.2 meters used for WAAS.

Additionally, it is important to note that the accuracy numbers used above do not have to incorporate DGPS ground station errors, only airborne errors, which are driven by GPS receiver noise and the small airborne multipath component. The 1 meter vertical accuracy 1-$\sigma$ in this context is believed to be quite achievable in practice. Furthermore, GPS monitor thresholds of 3–4 meters in the vertical, and about 9–12 meters in the lateral dimension appear to be realistic values for comparison with |S−M|.

Figure 5:
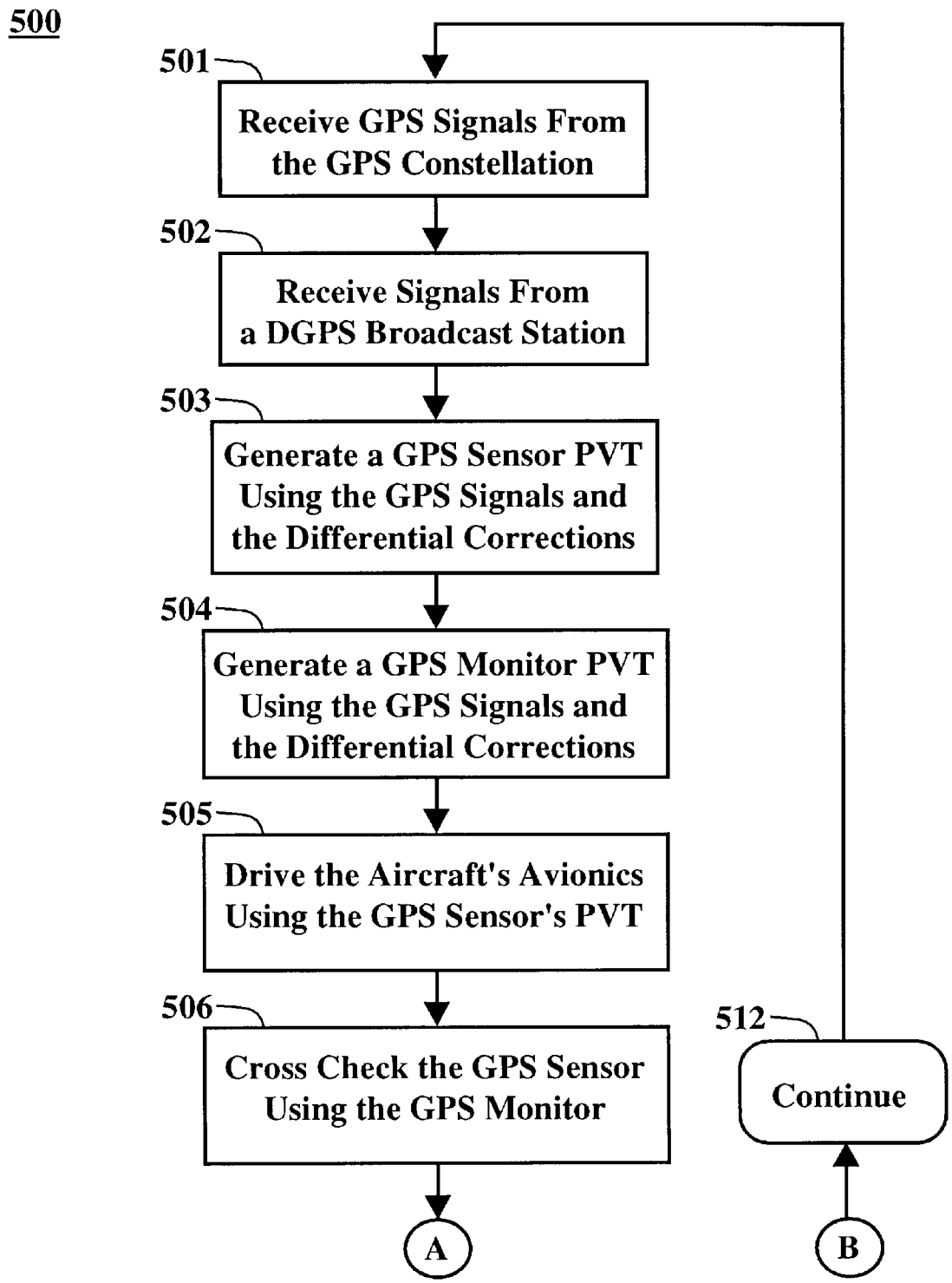
FIG. 5 is a flow chart of the steps of a process performed in accordance with one embodiment of the present invention.
Figure 5:
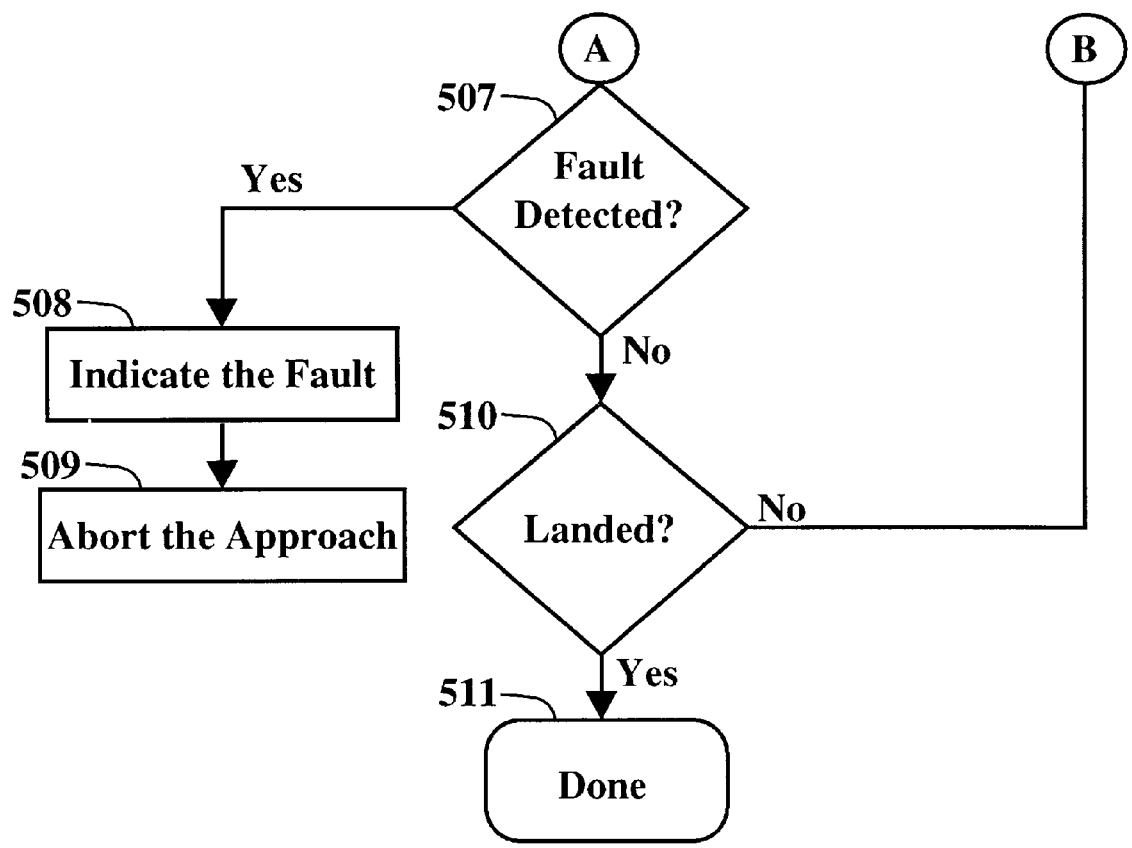

With reference now to FIG. 5, a flow chart 500 of the steps of a process performed in accordance with the present invention is shown. The process illustrated in flow chart 500 corresponds to the steps performed by system 200, as an aircraft including system 200 executes an approach to an airport runway.

In step 501, system 200 receives GPS signals from the GPS constellation. The GPS signals are received by a GPS sensor (e.g., GPS sensor 220 of FIG. 2) and a GPS monitor (e.g., GPS monitor 230 of FIG. 2) in accordance with the present invention.

In step 502, GPS sensor 220 and GPS monitor 230 receive differential correction signals from a DGPS broadcast station. As described above, the differential correction signals are used to augment the accuracy of the GPS signals. In addition, the signals received from the DGPS broadcast station include data regarding an intended flight path of the aircraft, from which deviation information is computed.

In step 503, GPS sensor 220 generates a GPS based PVT using the GPS signals and the differential corrections from the DGPS broadcast station. As described above, GPS sensor 220 is a relatively complex, highly capable GPS receiver designed to achieve very high accuracy. Using the GPS signals and the differential corrections, GPS sensor 220 generates an accurate PVT.

In step 504, GPS monitor 230 generates a GPS based PVT using the GPS signals and the differential corrections from the DGPS broadcast station. As described above, GPS monitor 230 is less complex and less expensive than GPS sensor 220. Using the GPS signals and the differential corrections, GPS monitor 230 generates an accurate PVT.

In step 505, the aircraft's avionics are driven using the PVT generated by GPS sensor 220. As described above, PVT generated by GPS sensor 220 is used to determine the actual flight path of the aircraft and thus, the vertical and lateral deviations from the intended flight path. This information is coupled to the autopilot through flight director 260 and displayed to the pilot through CDI 270 and is passed to host processor 250 to drive other instruments (e.g., map 290, CDU 280, etc., all of FIG. 2). Flight director 260 and CDI 270 are driven directly by GPS sensor 220 to avoid the necessity of appropriately certifying the host processor 250 or other instruments (e.g., I/O processor 295).

In step 506, system 200 cross-checks GPS sensor 220 using GPS monitor 230. In accordance with the present invention, GPS monitor 230 cross-checks the D/A converters within GPS sensor 220 using its own A/D converters. GPS monitor 230 also cross-checks the digital information provided by GPS sensor 220 by comparing it to its internally-generated PVT, and in so doing, tests the signal lines (e.g., lines 223a and the ports for signal line 223a, both of FIG. 2) for errors. GPS monitor 230 also compares the deviations computed by GPS sensor 220 against its own internally-generated deviations. In each case, the GPS monitor 230 compares the difference against a predetermined threshold to detect a fault.

In step 507, if a fault is detected (e.g., an error threshold is exceeded), system 200 proceeds to step 508. If a fault is not detected, system 200 proceeds to step 510.

In step 508, when a fault is detected, system 200 indicates the fault to the pilot (e.g., via the CDU 280) and to the instruments included in system 200 (e.g., CDI 270, flight director 260, and the like). Subsequently, in step 509, the aircraft aborts the approach through either the action of the flight director 260 or the action of the pilot.

In step 510, when no fault is detected, GPS monitor 230 and GPS sensor 220 continually transmit an "I'm OK"

signal to the rest of the instruments within system 200. If the aircraft is not on the ground (e.g., landed), system 200 proceeds to step 512, where steps 501 through 507 are repeated. If the aircraft has completed the approach and has landed, system 200 proceeds to step 511 and ends.

Thus, the present invention provides a navigation system which ensures a flight-essential degree of integrity. The system of the present invention supports the use of inexpensive GPS receivers while still meeting flight-essential integrity requirements. The present invention further provides a system which supports other navigation applications in addition to aviation.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. An integrity monitor global positioning system (GPS) navigation system, comprising:
   a primary GPS receiver adapted to determine a first position, said primary GPS receiver certified to a first certification level, said primary GPS receiver further adapted to provide GPS navigation data; and
   a secondary GPS receiver coupled to said primary GPS receiver, said secondary GPS receiver certified to a second certification level having less stringent requirements than said first certification level, said secondary GPS receiver adapted to determine a second position and monitor said primary GPS receiver to detect a fault condition by comparing said first position and said second position, such that said secondary GPS, receiver ensures the integrity of said primary GPS receiver and ensures said GPS navigation data is provided in accordance with said first certification level.

2. The system of claim 1, wherein said first certification level corresponds to RTCA DO178 Level B.

3. The system of claim 1, wherein said second certification level corresponds to RTCA DO178 Level C.

4. The system of claim 1, wherein said primary GPS receiver provides said navigation data directly to a plurality of primary flight instruments of an aircraft.

5. The system of claim 4, wherein said primary GPS receiver is further adapted to determine a first deviation of said aircraft from an intended flight path and said secondary GPS receiver is further adapted to determine a second deviation of said aircraft from said intended flight path, and wherein said first deviation and said second deviation are compared to detect a fault.

6. The system of claim 4, wherein said primary GPS receiver is adapted to provide said navigation data in a digital format to said plurality of primary flight instruments, and wherein said primary GPS receiver comprises at least one digital to analog converter certified in accordance with said first certification level, said at least one digital to analog converter coupled to provide said navigation data in an analog format to said plurality of primary flight instruments.

7. The system of claim 6, wherein said secondary GPS receiver is adapted to test said navigation data in said digital format to detect a fault in a communications port of said primary GPS receiver.

8. The system of claim 6, wherein said secondary GPS receiver includes at least one analog to digital converter adapted to receive said navigation data in said analog format and detect a fault in said at least one digital to analog converter.

9. An integrity monitor differential global positioning system (GPS) navigation system, comprising:
   a radio receiver adapted to receive a GPS differential correction message from a broadcast;
   a GPS sensor coupled to receive said differential correction message from said radio receiver, said GPS sensor adapted to determine a first position using said differential correction message, said GPS sensor further adapted to provide navigation data directly to a plurality of primary flight instruments of an aircraft, said GPS sensor certified to a first certification level; and
   a GPS monitor coupled to said GPS sensor, said GPS monitor coupled to receive said differential correction message from said radio receiver, said GPS monitor certified to a second certification level below said first certification level, said GPS monitor adapted to determine a second position using said differential correction message and monitor said GPS sensor to detect a fault condition by comparing said first position and said second position, such that said GPS monitor ensures the integrity of said GPS sensor and ensures said navigation data is provided in accordance with said first certification level.

10. The system of claim 9, wherein said first certification level corresponds to RTCA DO178 Level B.

11. The system of claim 9, wherein said second certification level corresponds to RTCA DO178 Level C.

12. The system of claim 9, wherein said GPS sensor is further adapted to determine a first deviation of said aircraft from an intended flight path and said GPS monitor is further adapted to determine a second deviation of said aircraft from said. intended flight path, said system further adapted to compare said first deviation and said second deviation to detect a fault.

13. The system of claim 9, wherein said GPS sensor is further adapted to provide said navigation data in a digital format to said plurality of primary flight instruments, and wherein said GPS sensor comprises at least one digital to analog converter certified in accordance with said first certification level adapted to provide said navigation data in an analog format to said plurality of primary flight instruments.

14. The system of claim 13, wherein said GPS monitor tests said navigation data in said digital format to detect a fault in a communications port of said GPS sensor.

15. The system of claim 13, wherein said GPS monitor includes at least one analog to digital converter adapted to receive said navigation data in said analog format and detect a fault in said at least one digital to analog converter.

16. The system of claim 13, wherein said GPS sensor and said GPS monitor are each adapted to detect a respective internal fault and flag said internal fault to said plurality of primary aircraft instruments.

17. In an integrity monitor differential global positioning system (GPS) navigation system, a method for providing high integrity navigation data for aircraft navigation, the method comprising the steps of:
   a) receiving a GPS (global positioning system) signal;
   b) receiving a GPS differential correction message from a broadcast by using a radio receiver;

c) determining a first position from said differential correction message and said GPS signal using a GPS sensor certified to a first certification level;

d) providing navigation data directly to a plurality of primary flight instruments of an aircraft by using said GPS sensor;

e) determining a second position from said differential correction message and said GPS signal using a GPS monitor certified to a second certification level having less stringent requirements than said first certification level;

f) ensuring said navigation data complies with the requirements of said first certification level by comparing said first position and said second position to detect a fault condition; and g) ensuring the integrity of said GPS sensor by comparing said first position and said second position.

18. The method of claim 17, further including the steps of:

h) determining a first deviation of said aircraft from an intended flight path using said GPS sensor;

i) determining a second deviation of said aircraft from said intended flight path using said GPS monitor; and j) detecting said fault condition by comparing said first deviation and said second deviation.

19. The method of claim 17, further including the steps of:

h) providing said navigation data in a digital format to said plurality of flight instruments by using said GPS sensor; and i) providing said navigation data in an analog format to said plurality of flight instruments by using at least one digital to analog converter certified to said first certification level included in said GPS sensor.

20. The method of claim 19, further including the step of:

j) testing said navigation data in said digital format to detect a fault condition in a communications port of said GPS sensor using said GPS monitor.

21. The method of claim 20, further including the step of:

k) using at least one analog to digital converter included in said GPS monitor to receive said navigation data in said analog format and detect a fault in said at least one digital to analog converter.

22. The method of claim 19, further including the steps of:

h) determining said first position using said GPS sensor certified to an RTCA DO178 Level B; and i) determining said second position using said GPS monitor certified to an RTCA DO178 Level C.

\* \* \* \* \*